Aug. 9, 1949.  C. P. POTTER  2,478,316
LAMINATED STATOR CORE STRUCTURE
Filed Oct. 12, 1945

INVENTOR
CHARLES P. POTTER
BY
ATTORNEY

Patented Aug. 9, 1949

2,478,316

UNITED STATES PATENT OFFICE 2,478,316

LAMINATED STATOR CORE STRUCTURE

Charles P. Potter, St. Louis, Mo., assignor to Wagner Electric Corporation, St. Louis, Mo., a corporation of Delaware Application October 12, 1945, Serial No. 622,031

2 Claims. (Cl. 171—252)

This invention relates to dynamoelectric machinery and in its more specific aspects is directed to an improved stator construction for motors and generators.

Various means have heretofore been used for maintaining stator laminae in assembled relation, one of the most simple and inexpensive of these being welds between the peripheral edges of the laminae along lines parallel to the axis of the stator, but in machines in which the magnetic density is high, undesirable losses are caused by such welds. An object of the present invention is to produce an inexpensive and efficient means for maintaining the lamiae in assembled relation which will not be subject to the aforesaid difficulty.

Another object of the invention is to provide an improved mechanism for maintaining stator punchings or laminae under compression and in position, which involves a substantially U-shaped member whose ends are integrally related to the stator and which has means provided thereon to increase the rigidity of the clamping element and provide means for securing the core to the stator frame and to space it therefrom to form air channels between the frame and the outer surface of the core.

Figure 1:
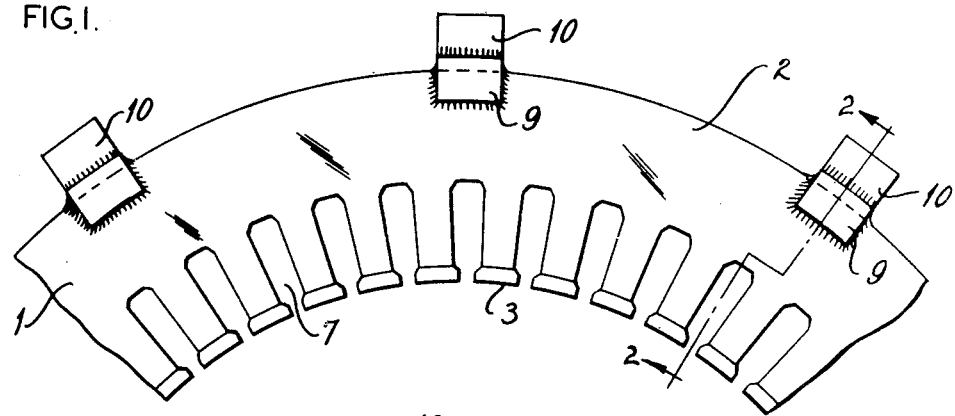
Figure 1 shows an end view of a portion of the stator core.

Figure 1 shows a portion of one of the stator punchings or laminae 1 having a smooth outer surface 2 and a plurality of slots therein to receive suitable windings arranged along the inner surface 3 on the stator punchings or laminae 1. The stator comprises a plurality of such laminae and in the instant illustration the two terminal or extreme laminae 4 and 5, between which a plurality of laminae 6 are disposed, have a thickness which is considerably greater than that of laminae 6, the former being preferably at least double the thickness of laminae 6.

Figure 2:
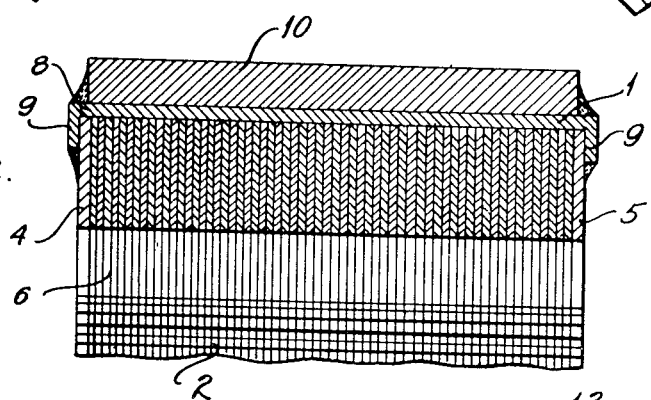
Figure 2 is a sectional view taken substantially along the line 2—2 of Figure 1.
Figure 4:
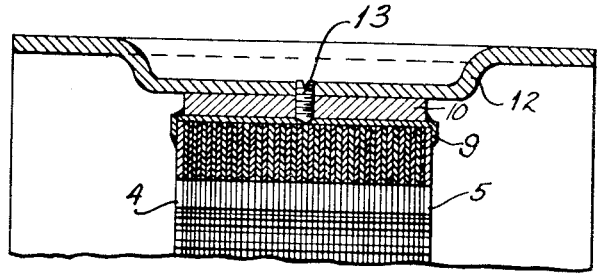
Figure 4 is a sectional view taken substantially along the line 4—4 of Figure 3.

The required number of stator laminae are assembled on an appropriate mandrel in which the slots 7 are suitably aligned to receive the windings, as previously indicated, and while in the mandrel, the stator core is subjected to the desired pressure axially of the stator core in a suitable press. When the desired pressure has been applied, a plurality of spaced apart clamping bar elements 8 are applied to the peripheral edge of the stator core parallel to the stator axis, as shown in Figure 2, the end pieces or ears 9, 9 thereof being welded to laminae 4 and 5, respectively. In order to increase the rigidity of bar members 8 and to provide means for spacing the core from the stator frame 11, bars 10 are laid on top of bar members 8 and are welded, as indicated in the drawing, to the members 8. Members 8, 9 and 10 being integrally associated, provide a comparatively strong substantially U-shaped clamp member for the core which eliminates the usual perforations in the laminae and bolts or rivets in order to keep said laminae in position.

Figure 3:
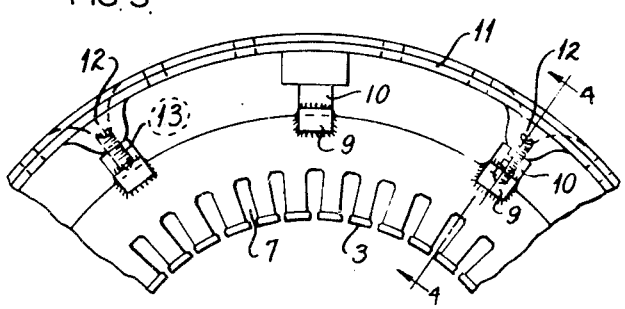
Figure 3 is an end view of a portion of the stator and frame assembly.

After members 10 have been secured in position, the outer surfaces thereof are machined to render them concentric with the stator core. The core assembly may be secured in position in frame 11 by suitable means engaging the frame and members 10, such as screws 13. The stator frame may be provided with indented portions 12, 12 on which bars 10 bear, as indicated in Figure 3.

Having fully described my invention, that which I claim as novel and desire to protect by Letters Patent of the United States is:

1. A stator core insertable in the frame of an electrical machine comprising a plurality of laminae, the terminal laminae having a thickness greater than the laminae arranged therebetween; a plurality of equally spaced bars disposed about the periphery of said core; a member integrally associated with the ends of each of said bars, each of said members being secured to said terminal laminae only; and other bar members welded to each of said bar members to reinforce same to securely hold said laminae and to hold the stator in the machine frame.

2. A stator core insertable in the frame of an electrical machine comprising a plurality of laminae, the terminal laminae having a thickness greater than the laminae arranged therebetween; a plurality of clamping means disposed about the periphery of said core, each clamping means consisting of a bar member whose ends are turned radially inwardly with respect to said core and secured to said terminal laminae only; and other bar members secured to said first mentioned bar members to reinforce same to securely hold said laminae and to hold the stator in the machine frame.

CHARLES P. POTTER.

REFERENCES CITED

The following references are of record in the file of this patent:

UNITED STATES PATENTS

| Number | Name | Date |
|---|---|---|
| 1,820,531 | Englehardt | Aug. 25, 1931 |
| 1,822,096 | Hollander | Sept. 8, 1931 |